(No Model.)
W. D. CHAPMAN.
TROLLING BAIT.
No. 323,111. Patented July 28, 1885.
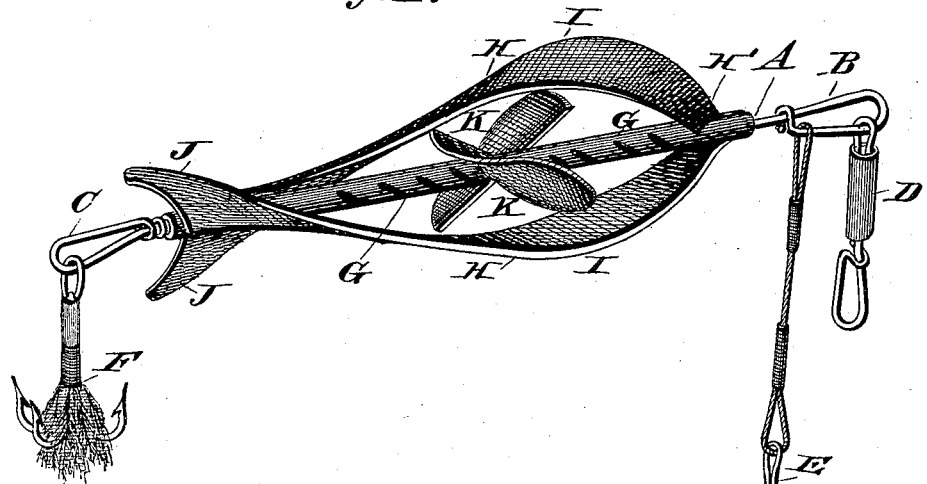
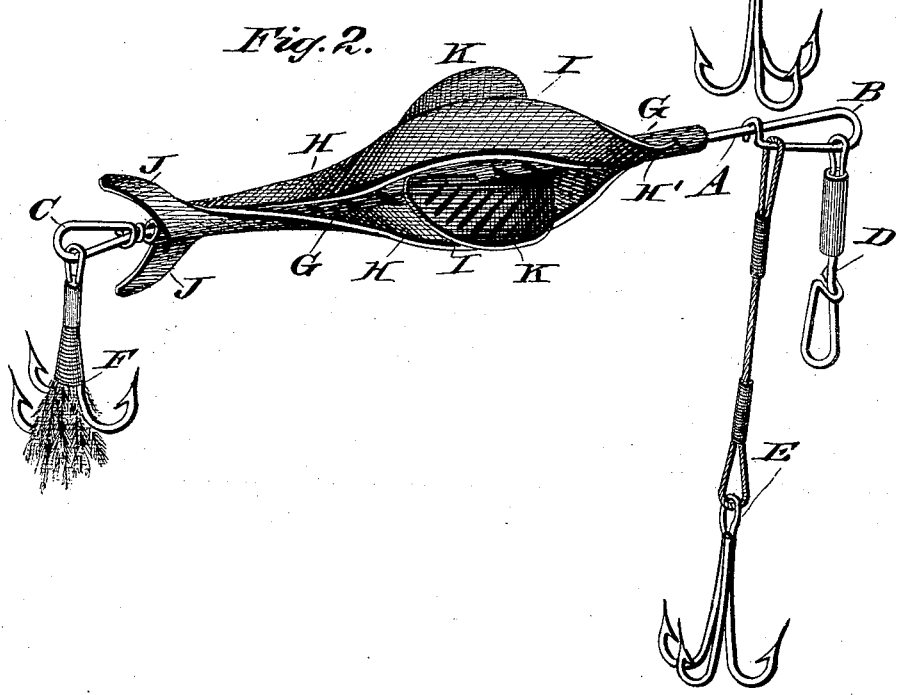
WITNESSES:
Fred. G. Dieterich
R. C. McElhinny
William D. Chapman,
INVENTOR.
By Louis Bagger & Co.,
ATTORNEYS.

UNITED STATES PATENT OFFICE.

WILLIAM D. CHAPMAN, OF THERESA, NEW YORK.

TROLLING-BAIT.

SPECIFICATION forming part of Letters Patent No. 323,111, dated July 28, 1885.

Application filed September 30, 1884. (No model.)

*To all whom it may concern:*

Be it known that I, WILLIAM D. CHAPMAN, of Theresa, in the county of Jefferson and State of New York, have invented certain new and useful Improvements in Trolling-Baits; and I do hereby declare that the following is a full, clear, and exact description of the invention, which will enable others skilled in the art to which it appertains to make and use the same, reference being had to the accompanying drawings, which form a part of this specification, and in which—

Figures 1 and 2 are perspective views of my improved trolling-bait seen from different sides.

Similar letters of reference indicate corresponding parts in both the figures.

My invention has relation to trolling-bait; and it consists in the improved construction and combination of parts of the same, as hereinafter more fully described and claimed.

In the accompanying drawings, the letter A indicates a rod, formed with eyes B and C at its ends, the said eyes formed by bending the end of the rod back and hooking the outer end, which is bent to form a catch or hook around the rod. The swivel D, by means of which the bait is secured to the line, is attached to the forward eye, B, into which also the loop of the side hook, E, is secured, and the hook F is attached to the rear eye, C. A sleeve, G, fits and turns freely upon the rod, and two strips, H H, of thin bright sheet metal or other suitable material, are secured at their forward slightly reduced ends to the forward portion of the sleeve, the edges of the ends being secured slightly obliquely to the axis of the sleeve, as shown at H'. The strips are thereupon twisted upon themselves and wrapped about half-way around the sleeve, forming a bulge, I, near the forward end and nearing to the sleeve near the rear end, where the strips are secured to the sleeve, and have their ends cut to represent each one-half of the tail of a fish, as shown at J, the said rear ends projecting in diametrically-opposite directions, but having a slight twist, all the twists and bulges causing the bait to be revolved in the water when dragged, and causing it to run steady through the water, the edges of the bulge I facing forward and the faces of the strips at that point being parallel with the axis of the sleeve, and thus causing the bait to retain its level and to pass perfectly true through the water. Two slightly-curved wings, K, are secured upon the sleeve immediately inside the place where the bulges are in the strips, and are secured upon the sleeve in an inclined position corresponding in direction and in incline to the incline of the rear portions of the strips, and the wings project laterally from the sleeve in the spaces between the bulged portions of the strips, and have their forwardly-facing sides, which are slightly concave, painted or striped with bright colors. These wings will, furthermore, serve to revolve the bait, and it will be seen that the strips being bright and the faces of the wings, as well as the sleeve, being striped and painted in bright colors, the entire bait will resemble a fish when it is dragged through the water, and attract other fish to attack it, the peculiar shape of the strips and the propeller-shaped wings serving to make the bait travel steadily and straight through the water.

Having thus described my invention, I claim and desire to secure by Letters Patent of the United States—

1. In a trolling-bait, the combination of the rod having the line, swivel, and hook attached to its ends, the sleeve having strips secured to it to form the outlines of a fish, and propeller-shaped wings secured upon the sleeve in the wider portion of the outlines of the fish, and having their concave faces facing forward, as and for the purposes shown and set forth.

2. In a trolling-bait, the combination of the rod formed with eyes at its ends for the attachment of the line and the hook, and having the side hook attached to the forward eye, the sleeve turning upon the said rod, the strips secured to the sleeve, with the edges of their forward ends oblique to the axis, twisted and bulged to form a bulge near their forward ends and secured at their rear ends to the sleeve, as described, and the propeller-shaped wings secured in an inclined position upon the sleeve in the space between the bulges of the strips, and having the concave forwardly-facing sides striped in bright colors, as and for the purpose shown and set forth.

In testimony that I claim the foregoing as my own I have hereunto affixed my signature in presence of two witnesses.

WILLIAM D. CHAPMAN.

Witnesses:
CHARLES W. THOMPSON,
CHARLES G. YEST.